United States Patent [19]

Terry

[11] 4,313,516
[45] Feb. 2, 1982

[54] AUTOMOBILE SNOW ASSEMBLY

[76] Inventor: D. A. Terry, Bayles Lake, Loda, Ill. 60948

[21] Appl. No.: 36,033

[22] Filed: May 4, 1979

[51] Int. Cl.³ .................... B62M 27/02; B62D 55/04
[52] U.S. Cl. ................................ 180/185; 180/9.26; 180/9.5; 280/14
[58] Field of Search ............... 180/182, 183, 184, 185, 180/9.2 R, 9.2 C, 9.26, 9.5, 15, 16, 22; 280/14, 686

[56] References Cited
U.S. PATENT DOCUMENTS

| | | | |
|---|---|---|---|
| 1,293,757 | 2/1919 | Green | 180/9.2C |
| 1,479,422 | 1/1924 | Bailey | 180/16 |
| 1,836,446 | 12/1931 | Christie | 180/9.2 R |
| 2,487,297 | 11/1949 | Berman | 180/182 |
| 2,821,949 | 2/1958 | Uyehara | 180/22 |
| 3,163,249 | 12/1964 | Ledohowski | 180/9.2 R |
| 3,199,620 | 8/1965 | Wheeler | 180/9.58 |
| 3,570,617 | 3/1971 | O'Day | 180/182 |
| 3,597,017 | 8/1971 | Tanaka | 180/9.2 R |
| 3,651,879 | 3/1972 | Wilson | 180/9.2 |
| 3,664,446 | 5/1972 | Burtis | 180/9.24 |
| 3,684,043 | 8/1972 | Hirsch | 180/184 |
| 3,756,615 | 9/1973 | Bray | 280/14 |
| 3,845,967 | 11/1974 | O'Brien | 280/14 |
| 3,921,743 | 11/1975 | Parrish | 180/9.2 C |
| 3,976,153 | 8/1976 | Lateur | 180/9.2 C |

*Primary Examiner*—John P. Silverstrim
*Attorney, Agent, or Firm*—Lockwood, Dewey, Alex & Cummings

[57] ABSTRACT

A snow assembly for conversion, for snow operation, of a normally road operable vehicle includes ski and track assemblies which are adapted to be mounted on the vehicle in place of the tires normally mounted thereon for road operation. The ski assembly includes a raise bracket which is mounted to a brake housing of the vehicle by the bolts which normally mount the tire to the brake housing and a ski which is mounted at the bottom of the raise bracket such that the ski is rotatable relative to the raise bracket to vary the angle between them. The raise bracket is preferably pivotally linked to the vehicle to stabilize the bracket in the direction of movement of the vehicle. Pneumatic tires are also preferably positioned on the ski assembly to enable operation of the vehicle both in snow and on open road when the snow assembly is installed on the vehicle. The track assembly includes a rigid frame which is mounted to the vehicle, a plurality of pneumatic bogeys mounted on the frame in spaced relationship to each other in the direction of movement of the vehicle, the bogeys being movable relative to the frame. Pivotal links are preferably provided connecting the axles of the bogeys to each other and an endless track encircles all of the bogeys. The track assembly is coupled to the powered brake housings of the vehicle.

22 Claims, 3 Drawing Figures

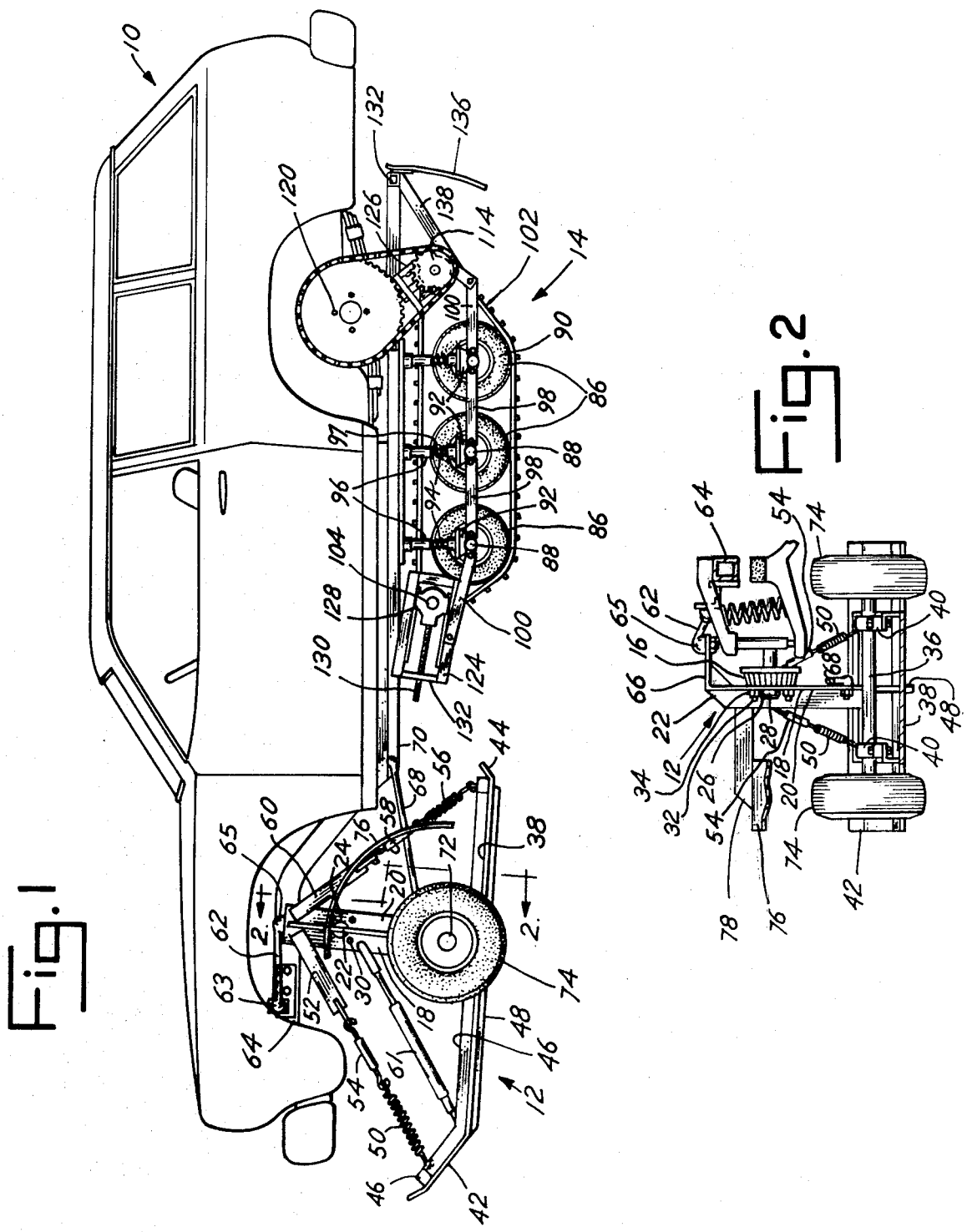

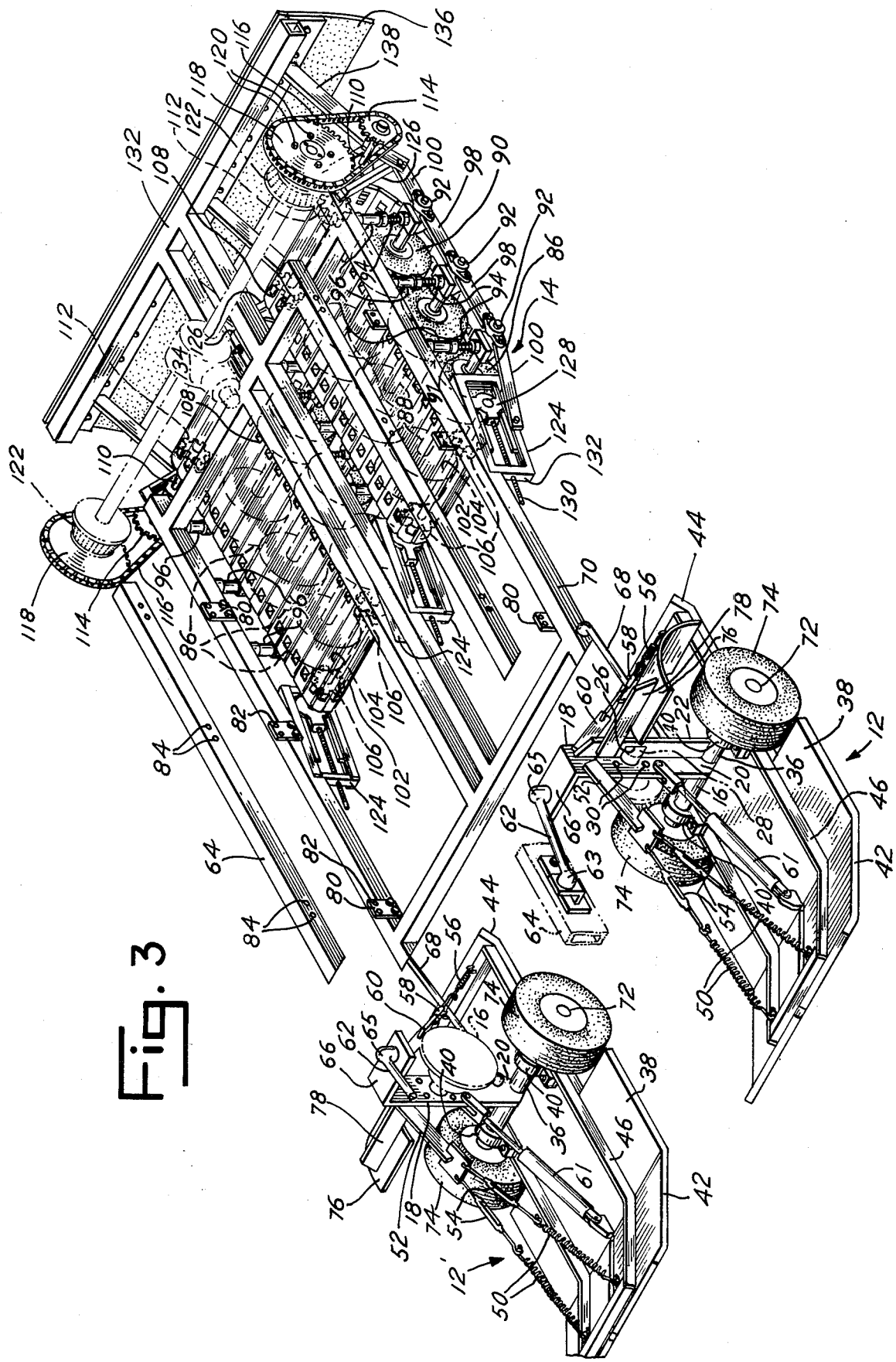

AUTOMOBILE SNOW ASSEMBLY

BACKGROUND AND SUMMARY OF THE INVENTION

The present invention related to a snow assembly and, in particular, to an assembly for converting a vehicle which is normally intended for road operation for operation both on the road and in deep snow.

Annually, one or more areas of the world which normally experience moderate winters receive record amounts of snow fall resulting in emergency conditions in urban areas and particularly in rural areas. During such emergencies, medical services and food supplies are frequently curtailed or completely denied to inhabitants because they are denied access to such services and supplies. Moreover, motorists frequently become stranded due to excessive amounts of snow and many might perish if not rescued.

Such emergency climatic conditions are frequently accompanied by the scarcity, if not complete absence, of adequate equipment to reach stranded, isolated persons and domestic farm animals. Moreover, the absence of necessary snow transportation equipment is common in areas where unusual snowfalls are only a rare occurrence once every 10-15 years. In such areas, it is uneconomical to maintain and have available at all times adequate and expensive equipment which will only find occassional use and, if purchased this year, may be antiquated and inoperable when it is actually needed.

The present invention has the purpose of overcoming these difficulties inexpensively and efficiently. The present invention relates to a snow assembly for converting conventional and readily available vehicles, such as automobiles, small trucks and other pieces of equipment, which are normally operable only on road surfaces for snow operation. The snow assembly of the present invention is relatively inexpensive and may be easily and rapidly installed on such conventional road vehicles in a minimum of time and with a minimum of effort, and may be easily stored during periods of non-use in a minimum of space. Moreover, the snow assembly of the present invention is not only capable of converting a normally road operable vehicle to be used cross country and in deep snows, but does not impair operation of the vehicle on cleared pavement when it is installed. The snow assembly of the present invention is capable of easy and rapid adjustment to meet varying snow conditions and structural differences of a wide variety of conventional, readily available vehicles. The snow assembly of the present invention takes full advantage of the pre-existing steering, suspension and drive and differential mechanisms of the conventional vehicle and, as such, is greatly simplified from the aspect of structural components and maintenance, as well as ease of installation, and retains all of the advantages of the vehicle prior to conversion with the present invention.

In one principal aspect of the present invention, a ski assembly is provided for conversion, for snow operation, of a vehicle which is normally only road operable and which normally has tires mounted on the brake housings of the vehicle. The ski assembly preferably comprises bracket means, mounting means for mounting the bracket means to one of the vehicle brake housings when its tire is removed such that the bracket means extends downwardly from the brake housing. The ski assembly also includes ski means mounted to the bracket means adjacent the bottom of the bracket means and rigid link means pivotally mounted to at least one of the bracket means and ski means. The link means includes attaching means for pivotal attachment of the link means to the vehicle to rigidly stabilize the bracket means and its ski means in the direction of the movement of the vehicle and prevent rotation of the bracket means on the brake housing.

In another principal aspect of the present invention, the aforementioned ski assembly also includes wheels which renders the assembly capable of operation both in deep snow and on open road.

In still another principal aspect of the present invention, a ski assembly includes bracket means and mounting means for mounting the bracket means to a vehicle. Ski means are mounted to the bracket means adjacent the bottom of the bracket means and such that the bracket means and ski means are rotatable relative to each other to vary the angle between them in the direction of movement of the vehicle. Adjustment means is provided for adjusting that angle.

In still another principal aspect of the present invention, a track assembly comprises rigid frame means and at least two rotatable bogey means each of which includes an axle and at least one wheel mounted for rotation on the axle. Each of the bogey means is mounted in spaced relationship to each other in the direction of movement of the vehicle on the frame means and each is movable independently relative to the frame means. Link means pivotally connects the axles of the bogey means to each other. Endless track means encircles the bogey means wheels and drive means drives the track means.

Finally, in still another principal aspect of the present invention, a snow assembly for conversion for snow operation of a vehicle which is normally road operable and which normally has tires mounted on the brake housings of the vehicle, includes a ski assembly, as previously described, for mounting on some of the brake housings of the vehicle when the tires are removed, and a track assembly, as previously described, for mounting on the remaining brake housings of the vehicle which are powered by the vehicle.

These and other objects, features and advantages of the present invention will become clear upon consideration of the following detailed description.

BRIEF DESCRIPTION OF THE DRAWINGS

In the course of this description, reference will be frequently made to the drawings in which:

FIG. 1 is an overall side elevation view of an automobile in which the preferred embodiment of snow assembly of the present invention has been installed;

FIG. 2 is a cross-sectioned rear elevation view along lines 2—2 of FIG. 1 of one of the ski assemblies of the present invention and showing the ski assembly mounted upon the pre-existing structure of the automobile; and FIG. 3 is an isometric view of the ski and track assemblies of the snow assembly shown in FIG. 1.

DETAILED DESCRIPTION OF THE PREFERRED EMBODIMENT

In FIG. 1 a vehicle 10, such as a conventional, readily available automobile (as shown), a pick-up truck, ambulance, or the like, is shown which is normally operable on road surfaces on four or more pneumatic tires (not shown). The vehicle 10, as shown in FIG. 1, has been converted by a preferred embodiment of snow conversion assembly of the present invention for operation either on cleared or semi-cleared road surfaces or in deep snow.

The preferred snow assembly of the invention generally includes a pair of ski assemblies 12 and 12' which are mounted on each of the front brake housings of the vehicle, and a track assembly 14 which is mounted at the rear of the vehicle and coupled to the rear driven brake housings of the vehicle. As shown in FIG. 3, two ski assemblies 12 and 12' are preferably provided, one each for mounting to each of the front wheel brake housings 16 of the vehicle. Ski assembly 12 only will be described, it being understood that the other ski assembly 12' is substantially identical, except that it is a mirror image of ski assembly 12.

Ski assembly 12 includes a rigid, upwardly extending raise bracket 18. As shown in the drawings, the raise bracket 18 preferably comprises a substantially rigid, heavy flat plate 20 which may be reinforced with an outwardly extending web 22 which is either formed integrally with the plate 20 or welded to the plate and extending substantially over the vertical length of the plate 20. The plate 20 intermediate its length is apertured at 24 and the web 22 is notched at 26 as shown in FIGS. 1 and 2 to receive the grease hub 28 of the brake housing 16. In addition, the plate 20 also includes a plurality of spaced holes 30, as shown in FIG. 1, surrounding aperture 24. Holes 30 are spaced identical to the spacing of the tire mounting bolts 32 on the brake housing 16 which are normally provided to attach the road operating pneumatic tire (not shown) to the vehicle for road operation. When the tire is removed, the ski assembly 12 is installed in place of the tire, the bolts 32 extending through holes 30 and the normal wheel nuts 34 shown in FIG. 2 secure the ski assembly to the brake housing 16.

A tubular member 36, as shown in FIGS. 2 and 3, is rigidly attached to the bottom of the raise bracket 18, such as by welding, and extends to each side of the raise bracket in a direction generally perpendicular to the axis of the raise bracket and direction of movement of the vehicle. An elongate ski 38 formed of heavy material, such as a heavy gage sheet steel, is mounted to the tubular member 36 by way of pillow blocks 40 at each end of the tubular member. The pillow blocks 40 include bearing races (not shown) which, thus, enable a degree of rotation between the ski 38 and the raise bracket 18 to allow variation of the angle between these two elements in the direction of movement of the vehicle as will be explained in more detail hereafter. The ski 38 is preferably inclined upwardly at 42 at its forward end as shown in FIGS. 1 and 3, and is also slightly upwardly inclined at 44 at its trailing end. The ski 38 may be reinforced at its upper surface by transversely and longitudinally extending reinforcing webs 46 as shown particularly in FIG. 3 welded to the upper surface of the ski. In addition, an elongate strip of metal may be rigidly attached to extend fore and aft beneath the center of the ski to form a guide rudder 48 as shown in FIG. 1.

A pair of springs 50 extend forward from the raise bracket 18 and are connected at the forward, upwardly inclined portion 42 of the ski 38 as shown in FIGS. 1 and 3. One end of each of the springs 50 is preferably coupled to the forward, transversely extending portion of the reinforcing web 46 as shown in FIGS. 1 and 3, and the other end is coupled to a bracket 52 which is rigidly welded at the upper end of the raise bracket 18. A turnbuckle 54 is also provided with each of the springs 50 to allow adjustment of the angle of the ski 38 relative to the raise bracket 18 in the direction of movement of the vehicle. Another spring 56 and turnbuckle 58 is provided at the rear of the ski 30 extending between the rear, transversely extending portion of the reinforcing web 46 and a bracket 60 which is also attached, as by welding, at the rear and top of the raise bracket 18 as shown in FIGS. 1 and 3. Turnbuckle 58 also assists in the adjustment of the angle of the ski 38 relative to the raise bracket 18 in the direction of movement of the vehicle.

From the foregoing description it will be understood that adjustment of the angle of attack of the ski, i.e. the ski angle in the direction of the movement of the vehicle, can be easily accomplished to suit snow conditions and the particular vehicle upon which the ski assembly 12 is installed by adjusting the turnbuckles 54 and 58. Such adjustment causes the ski to rotate in the bearings of pillow blocks 40 about the tubular member 36. The turnbuckles 54 and 58 also adjust the tension on the springs 50 and 58. The springs 50 and 56 absorb shock imparted to the ski assembly during operation. In addition a shock absorber 61 may also be attached between the raise bracket 18 and ski 38, as shown in FIGS. 1 and 3, to dampen such shocks.

One or more rigid links are also provided for coupling the ski assembly 12 to the vehicle. As shown in FIGS. 1-3, one such link may comprise a rigid link 62 pivotally coupled at one end by a ball and socket 63 directly to the frame 64 of the vehicle and at the other end, also by a ball and socket 65, to a horizontally extending bracket 66. Bracket 66 is rigidly attached to the upper end of the raise bracket 18, as by welding, as is shown in FIGS. 2 and 3. Rigid link 68 may also extend between the raise bracket 18 to the rear of the ski assembly 12. Link 68 is also pivotally coupled to the raise bracket 18 and either further back on the frame 64 of the vehicle or to the rigid frame 70 of the track assembly 14. Although two rigid pivotal links 62 and 68 are shown for each ski assembly, it will be understood that only one of these links may be provided. Whichever link is provided, the link 62 or 68 rigidly stabilizes the raise bracket 18 in the direction of motion of the vehicle during operation.

A rotating shaft 72, as shown in FIGS. 1 and 3 extends through the tubular member 36 to form an axle assembly together with the tubular member for rotational mounting of a pair of pneumatic tires 74 at each end of the shaft 72. The lower peripheny of the tires 74 extends beneath the lowermost surface of the ski 38 so that the tires 74 engage the road surface in the event that the vehicle 10 is to be operated on cleared roads with the ski assembly 12 installed. Due to the presence of the tires 74, a fender 76 is also preferably provided, at least for the outer tire, to prevent snow or mud from accumulating on the body of the vehicle 10. The fender 76 may be attached by means of a rigid bracket 78 to the raise bracket 18, as is shown in FIGS. 2 and 3, by welding.

The structural elements which remain unnumbered in FIG. 2 are merely standard steering and suspension components of the vehicle 10 and do not form a particular part of the present invention, except that full advantage may be taken of the function of these elements in the operation of the present invention. By way of example, it will be readily understood that because the ski assemblies 12 and 12' are mounted directly to the front brake housings 16 of the vehicle, the ski assemblies are fully steerable by the steering assembly of the vehicle without the need for further steering elements. Such standard vehicle elements, may vary between vehicles and differ from those shown in FIG. 2.

The track assembly 14 comprises a relatively rigid, substantially rectangular frame 70 having a plurality of upwardly extending brackets 80 as shown in FIG. 3. Brackets 80 may have one or more holes 82 which are adapted to overlie corresponding holes 84 in the main frame 64 of the vehicle so that the track frame 70 may be stationarily, but removably attached to the frame 64 of the vehicle.

As shown in FIGS. 1 and 3, three pairs of bogey assemblies 86 are mounted on each side of the frame 70. Each of the bogey assemblies 86 comprises a rotatable axle 88 and a pair of bogey wheels 90 mounted at each end of the axle. The bogey tires 90 are preferably pneumatic to facilitate operation of the track assembly on cleared road surfaces. Both outer ends of each of the six axles 88 are journaled into one of twelve pillow blocks 92 for rotation. Each of the pillow blocks 92 are, in turn, mounted on a piston rod 94 which extends upwardly and into a tubular cylinder 96 as shown in FIGS. 1 and 3. The cylinders 96, in turn, are stationarily attached to the underside of the track frame 70. A coil spring 97 encircles each of the piston rods 94 and, at its upper end, bears against the bottom end of cylinder 96 and, at its bottom end, against the pillow block 92 to normally urge the pillow blocks, and their respective bogey axles 88 downwardly as viewed in the drawings. Thus, each of the pairs of the bogey wheels or tires 90 and their axles 88 are mounted for movement toward and away from the track frame 70 at each of axle ends by a pair of said piston rods 94, cylinders 96 and springs 97. This is advantageous for traversing rock or log strewn terrain, because a given set of bogey wheels can move upwardly when it moves over a rock or log.

Each of the adjacent pillow blocks 92 in the fore and aft direction are also coupled together by links 98 as shown in FIGS. 1 and 3. Links 98 are pivotally attached at their ends to adjacent ones of the pillow blocks 92 as shown in FIGS. 1 and 3. In addition, the furthest fore and aft pillow blocks 92 are coupled, by links 100, to the stationary portion of the track assembly. The pivotal links 98 and 100 stabilize the bogey assemblies 86 against fore and aft movement in the direction of movement of the vehicle during operation.

A pair of endless snow tracks 102 encircle each of three of the pairs of bogey wheels 90. One track 102 is provided for the three pairs of bogey assemblies 86 on the right, rear side of the track assembly 14 and the other track 102 encircles the three pairs of bogey assemblies 86 on the other left, rear side of the track assembly. Axles 88 of the bogey assemblies on the right side of the vehicle are not coupled to their corresponding bogey axles on the left side of the vehicle. Thus, each of the tracks 102 operates independently of the other to take advantage of the differential action of the vehicle.

A rotatable idler shaft 104 extends across each of the tracks 102 at the forward end of the tracks. Each shaft 104 includes a pair of toothed sprockets 106 which are adapted to engaged slotted openings 108 in each of the tracks 102.

A rotatable drive shaft 110 also extends across each of the tracks at the rear of the tracks 102. Shaft 110 includes a pair of spaced sprockets 112 which are also adapted to engage slotted openings 108 in the tracks 102 for driving the tracks. Attached to each of the drive shafts 110 at their outer ends is a toothed sprocket 114 which is coupled by an endless chain 116 to a drive sprocket 118. A plurality of spaced holes 120 are positioned on the drive sprocket 118 to receive the corresponding mounting bolts on the rear brake housings 122 of the vehicle. Thus, after removal of the normal pneumatic tires (not shown), drive sprockets 118 are attached in place of the tires of the vehicle to drive each of the tracks 102 independently of each other.

A plurality of threaded adjustment assemblies 124 are rigidly welded to the frame 70 to mount each of the two forward idler shafts 104. A pair of adjustment assemblies 126 are also provided for mounting each of the two rear drive shafts 110. Except for the angle at which they are mounted, adjustment assemblies 124 and 126 are substantially identical in construction. Thus, only one of the adjustment assemblies 124 will be described in detail.

Adjustment assembly 124 includes a sliding pillow block 128, as shown in FIGS. 1 and 3, in which an end of idler shaft 104 is received for rotation. An elongate screw 130 is threaded through one of the stationary frame ends 132 of the adjustment assembly frame and bears against the pillow block 128 to move the pillow block slidingly back and forth along the frame of the adjustment assembly. Thus, as the pillow block 128 is moved to the left as viewed in FIG. 1, its rotatable shaft 104 is also moved to the left to tension the track 102. Movement in the opposite direction will slack the track 102. Because each shaft 104 and 110 includes an adjustment assembly at each end, the adjustment assemblies not only function to tension or slack the track 102, but also to adjust the skew of the rotating shafts with respect to the track and ensure that the track uniformly contacts the ground surface to minimize track wear and maximize traction. The rear adjustment assemblies 126 are preferably mounted at a somewhat steeper angle than the forward assemblies 124 so that they function to both adjust the tracks 102 and the drive chain 116.

Although the track assembly frame 70 has been described as being substantially rectangular, the frame is preferably extended in a T-fashion toward the rear of the frame with a perpendicular beam 132 extending across the rear of the frame. As shown in FIG. 3, this extension straddles the rear axle and differential 134 of the vehicle and provides a structure for attachment of a long snow flap 136. The rear beam 132 is also preferably reinforced by way of welded reinforcing braces 138 extending between the beam 132 and the rear adjustment assemblies 126.

It will be seen from the above description that the ski assemblies 12 and 12' and track assembly 14 may be readily installed upon a normally road operating vehicle in a minimum of time and with a minimum of effort in place of the pneumatic tires normally on the vehicle. However, once the snow assembly of the present invention has been installed, the vehicle is still capable of road operation in addition to operation in deep snow. In practice, it has been found that complete changeover time to convert a standard automobile with the snow assembly disclosed herein is about one hour for an experienced mechanic with a normal inventory of tools. Once converted, the vehicle is capable of speeds in access of 50 miles per hour both in deep snow and on cleared roads.

It will also be appreciated that the ski assemblies of the present invention are mounted directly to the brake housings in place of the tires normally mounted thereon. Thus, full advantage may be taken of the steering linkages and vehicle suspension already present on the vehicle. Moreover, because each of the tracks 102 is coupled to one of the brake housings 122 at the rear of the vehicle, each of the tracks operates independently and is able to take full advantage of the normal differential action of the vehicle.

It will be understood that the embodiments described herein are merely exemplary of the principles of the invention and that variations from the above description are still within the scope of the invention. For example, although a pair of wheels 74 have been shown on each of the ski assemblies 12 and three pairs of bogey wheels have been shown for each track 102, the number of these wheels may be varied without departing from the spirit and scope of the invention.

What is claimed is:

1. A snow assembly for conversion for snow operation, of a vehicle which is normally only road operable and having tires mounted on the brake housings of the vehicle, said assembly comprising:
   bracket means,
   mounting means for mounting said bracket means to one of the vehicle brake housings when its tire is removed and such that said bracket means extends downwardly from the brake housing;
   ski means mounted to said bracket means adjacent the bottom of said bracket means,
   track means for driving the vehicle,
   a pair of rigid link means pivotally mounted to a least one of said bracket means and ski means, said link means including attaching means for pivotal attachment of one of said link means to said track means and the other of said link means to the vehicle to rigidly stabilize said bracket means and ski means in the direction of movement of the vehicle and prevent rotation of said bracket means on the brake housing.

2. The assembly of claim 1 wherein the vehicle is of the type in which the tires are mounted on the brake housings by a plurality of spaced bolts, said mounting means comprising a plurality of holes through said bracket means spaced in similar relationship to each other as the spaced bolts on the vehicle brake housing to, thereby, receive the spaced bolts for mounting of the ski assembly on the brake housing when the tire is removed from the brake housing.

3. The assembly of claim 2 wherein said rigid link means is pivotally attached to said bracket means, wheel means extending beneath said ski means, said wheel means comprising a pair of wheels spaced from each other in a direction generally perpendicular to the direction of movement of the vehicle and extending beneath said ski means for allowing operation of the vehicle on clear road surface when said ski assembly is mounted on the vehicle, said wheel means including axle means mounted upon said ski means and said bracket means and upon which said pair of wheels are mounted for rotation, at least one of said ski means and said bracket means being mounted for rotation on said axle means to vary the angle between said bracket means and ski means in the direction of movement of the vehicle, and adjustment means cooperating with said axle means for adjusting said angle between said bracket means and said ski means.

4. The assembly of claim 3 wherein said pair of wheels comprise pneumatic tires.

5. The assembly of claim 1 wherein said rigid link means is pivotally attached to said bracket means.

6. The assembly of claim 1 including wheel means, said wheel means extending beneath said ski means for allowing operation of the vehicle on clear road surface when said ski assembly is mounted on the vehicle.

7. The assembly of claim 6 wherein said wheel means comprise a pair of wheels spaced from each other in a direction generally perpendicular to the direction of movement of the vehicle.

8. The assembly of claim 6 wherein said wheel means comprise at least one pneumatic tire.

9. The assembly of claim 6 wherein said wheel means includes axle means, said axle means being mounted to said ski means and said bracket means.

10. The assembly of claim 9 wherein at least one of said ski means and said bracket means is mounted for rotation on said axle means to vary the angle between said bracket means and ski means in the direction of movement of the vehicle, and adjustment means for adjusting said angle between said bracket means and said ski means.

11. The assembly of claim 10 wherein said ski means is rotatable on said axle means to vary said angle.

12. The assembly of claim 1 including spring means attached between said ski means and said bracket means.

13. The assembly of claim 1 wherein the angle between said bracket means and said ski means in the direction of movement of the vehicle is variable, and adjustment means for adjusting the angle between said bracket means and said ski means.

14. The assembly of claim 1, said track means comprising:
   rigid frame means,
   at least two bogey means, each of said bogey means comprising an axle and at least one wheel mounted for rotation on said axle,
   mounting means mounting each of said bogey means in spaced relationship to each other in the direction of movement of the vehicle on said frame means, said bogey means being moveable relative to said frame means,
   link means pivotally connecting the axles of both said bogey means to each other and to said frame means,
   endless track means encircling said wheels of said bogey means, and
   drive means for driving said track means.

15. The assembly of claim 14 including second link means pivotally attaching at least one of said axles to said rigid frame means.

16. The assembly of claim 14 wherein said mounting means includes piston means connected between said frame means and the axles of said bogey means for allowing said movement of said axles relative to said frame means.

17. The assembly of claim 16 said mounting means including spring means for normally urging said axles away from said frame means.

18. The assembly of claim 14 wherein each of said bogey means comprises a pair of said wheels spaced from each other in a direction perpendicular to the direction of movement of the vehicle.

19. The assembly of claim 14 wherein each of said wheels comprise pneumatic tires.

20. The assembly of claim 14 wherein said drive means comprises rotatable means for engaging said track means to drive said track means, said rotatable means including coupling means for coupling said rotatable means to the drive train of the vehicle.

21. The assembly of claim 20 including track adjustment means for selectively adjusting the slack in said endless track means, said adjustment means selectively moving said rotatable means relative to said frame means.

22. The assembly of claim 14 wherein the assembly is for conversion, for snow operation, of a vehicle which is normally only road operable and having tires mounted on the brake housings of the vehicle, mounting means for mounting said frame means stationarily on the vehicle, said drive means comprising means for coupling said track means to a brake housing of the vehicle when its tire is removed.

* * * * *

UNITED STATES PATENT AND TRADEMARK OFFICE
CERTIFICATE OF CORRECTION

PATENT NO. : 4313516

DATED : February 2, 1982

INVENTOR(S) : D.A. Terry

It is certified that error appears in the above—identified patent and that said Letters Patent are hereby corrected as shown below:

Column 5 line 64 delete "engaged" and insert --engage--

Column 8 line 10 delete "comprise" and insert --comprises--

Signed and Sealed this

Fifth Day of October 1982

[SEAL]

Attest:

GERALD J. MOSSINGHOFF

Attesting Officer

Commissioner of Patents and Trademarks